United States Patent
Holland (10) Patent No.: US 7,675,513 B2
(45) Date of Patent: Mar. 9, 2010

(54) SYSTEM AND METHOD FOR DISPLAYING STEREO IMAGES

(75) Inventor: Nicholas P. Holland, Salt Lake City, UT (US)

(73) Assignee: Evans & Sutherland Computer Corp., Salt Lake City, UT (US)

(*) Notice: Subject to any disclaimer, the term of this patent is extended or adjusted under 35 U.S.C. 154(b) by 0 days.

(21) Appl. No.: 12/326,807

(22) Filed: Dec. 2, 2008

(65) Prior Publication Data

US 2009/0231331 A1 Sep. 17, 2009

Related U.S. Application Data

(60) Provisional application No. 61/036,883, filed on Mar. 14, 2008.

(51) Int. Cl.
*G06T 15/00* (2006.01)
(52) U.S. Cl. .................. 345/418; 348/42; 382/154; 717/106
(58) Field of Classification Search ........... 345/418, 345/419, 506, 581; 382/154, 312; 717/106, 717/108; 348/42, 46, 47
See application file for complete search history.

(56) References Cited

U.S. PATENT DOCUMENTS

| 6,141,034 | A | 10/2000 | McCutchen |
|---|---|---|---|
| 6,388,666 | B1 | 5/2002 | Murray |
| 6,618,054 | B2* | 9/2003 | Deering ................ 345/581 |
| 6,857,746 | B2 | 2/2005 | Dyner |
| 6,999,087 | B2 | 2/2006 | Lavelle et al. |
| 7,167,181 | B2* | 1/2007 | Duluk et al. ........... 345/506 |
| 7,257,249 | B2* | 8/2007 | Farsaie ................. 382/154 |
| 2006/0087507 | A1 | 4/2006 | Urano et al. |
| 2006/0210111 | A1 | 9/2006 | Cleveland et al. |
| 2007/0182738 | A1 | 8/2007 | Feldman et al. |
| 2007/0263923 | A1 | 11/2007 | Gienko et al. |
| 2008/0018732 | A1 | 1/2008 | Moller |
| 2008/0143964 | A1 | 6/2008 | Cowan et al. |

\* cited by examiner

*Primary Examiner*—Phu K Nguyen
(74) *Attorney, Agent, or Firm*—Thorpe North & Western LLP (57) ABSTRACT

A method for displaying a stereo eye image on a curved surface is disclosed. A mathematical model of a computer generated scene having a vertex may be generated. A mono vertex vector may be calculated normal to the curved surface at the vertex location on the curved surface to a center of a viewer position. A left vertex may be calculated by applying a cross product to the vertex vector and a viewer's eye position vector. A right vertex may be calculated into the frame buffer by applying the cross product to the vertex vector and a negative viewer's eye position vector. The calculated points may be projected onto a curved surface for viewing.

20 Claims, 8 Drawing Sheets

SYSTEM AND METHOD FOR DISPLAYING STEREO IMAGES

PRIORITY CLAIM

Priority of U.S. Provisional patent application Ser. No. 61/036,883 filed on Mar. 14, 2008 is claimed and is hereby incorporated herein by reference in its entirety.

BACKGROUND

To trick the eye and mind into seeing a 3-dimensional (3D) stereo image from a projected display image, a separate image is displayed for each eye. Traditional stereo images are displayed on a flat screen. The figures discussed below illustrate the conventional generation of 3D stereo images, and the figures are plan sections through a screen. A line represents a regular screen, and a circle represents a cross-section through a spherical screen.

Figure 1:
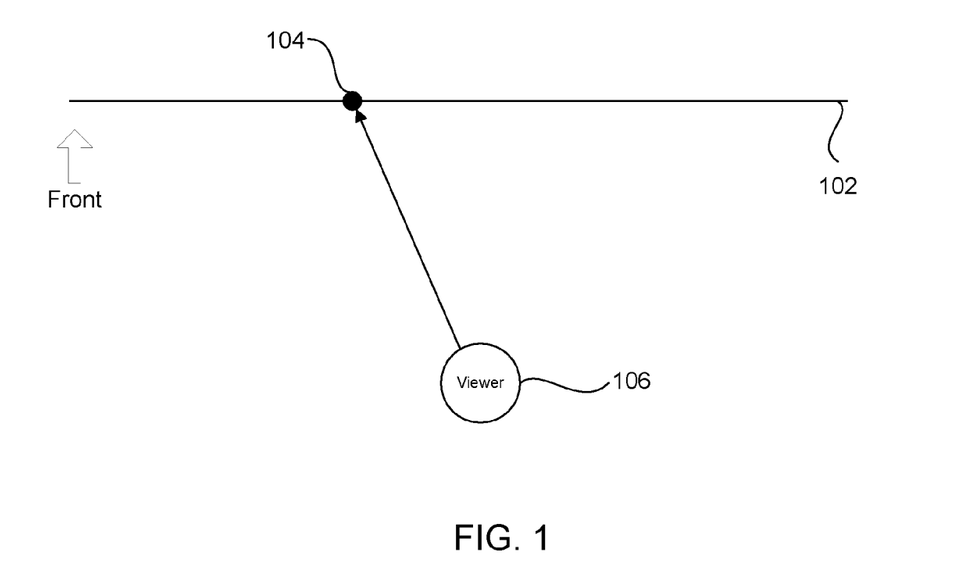
FIG. 1 is a diagram illustrating a flat screen with a single point that represents the many points used to form an entire image.

In FIG. 1, a flat screen 102 is shown with a single dot 104 that represents the multitude of points used to form an entire image. The viewer 106 is in front of the screen and sees the single dot along with many other points on the screen. This is what viewers observe in a movie theater, on a television, or on a computer monitor when each eye receives the same image from the screen. The image on the screen appears to be at the same distance from the observer as the screen itself.

When a stereo image is represented on the screen, then two separate images are displayed and this includes one image for each eye. Making sure that each eye only sees one image may be accomplished in many ways. Some of the main methods that are used to separate the images for each eye can include color filtering such as red/blue or red/green filtering with glasses systems. In addition, polarization glasses can be used to separate the images, or active shuttering glasses can also be used. Other methods are available that can be used to separate the images for viewers' eyes and more methods may be developed in the future that provide similar 3D viewing results using separated images.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
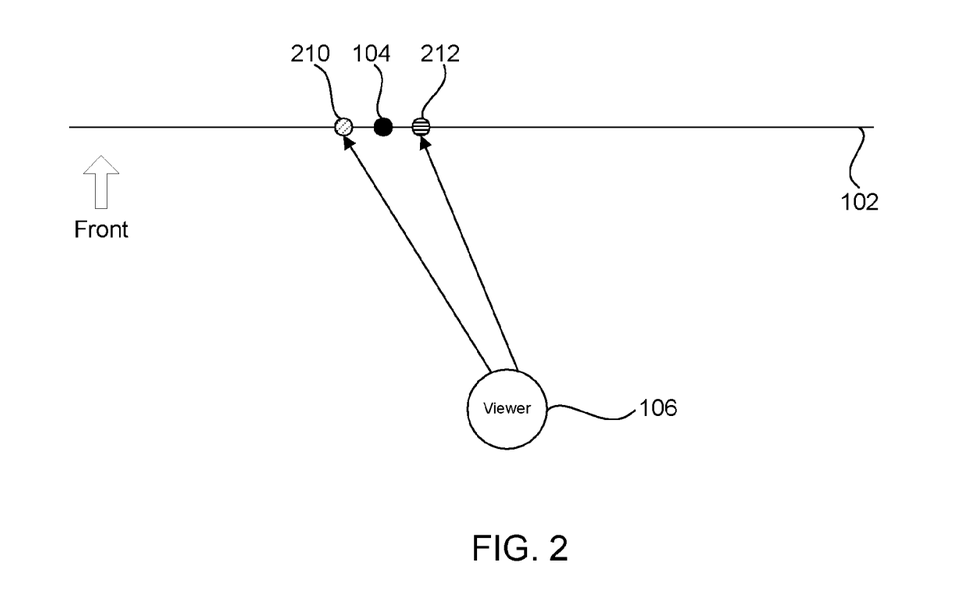
FIG. 2 is a diagram illustrating the generation of a 3-dimensional image where the object appears to be far away from the observer.

FIG. 2 illustrates the generation of a 3-dimensional image where the object appears to be far away from the observer 106. The image of the single point 104 is actually displayed on the screen as a two separate points 210, 212. Each point represents how that point (or dot) would look to the individual eye in the observer's head and using two points allows the images to be separated by the optical separation systems described previously.

Figure 3:
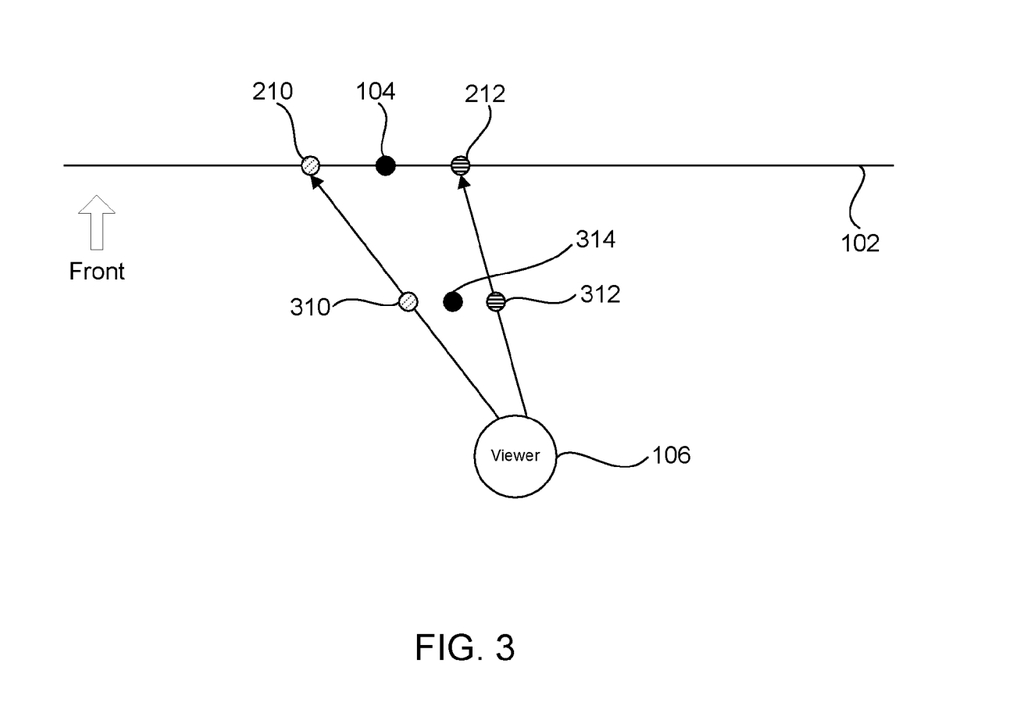
FIG. 3 is a diagram illustrating the generation of a 3-dimensional image where an object nearer to the observer is displayed on the screen.

FIG. 3 further illustrates the generation of a 3-dimensional image where an object nearer to the observer 106 is displayed on the screen 102. If the object is closer to the eye in 3D space, then the individual images and the dots in those images 210, 212 are displayed further apart on the flat screen as illustrated. As the point moves around in 3D space, the left and right eye representations of the point move apart and come closer together. For example, FIG. 3 illustrates that as points are moved farther apart on the screen, then the viewer's mind perceives these points 310, 312 as being closer 314 to the viewer. However, they are always computed in a single plane relative to the original point.

Figure 4:
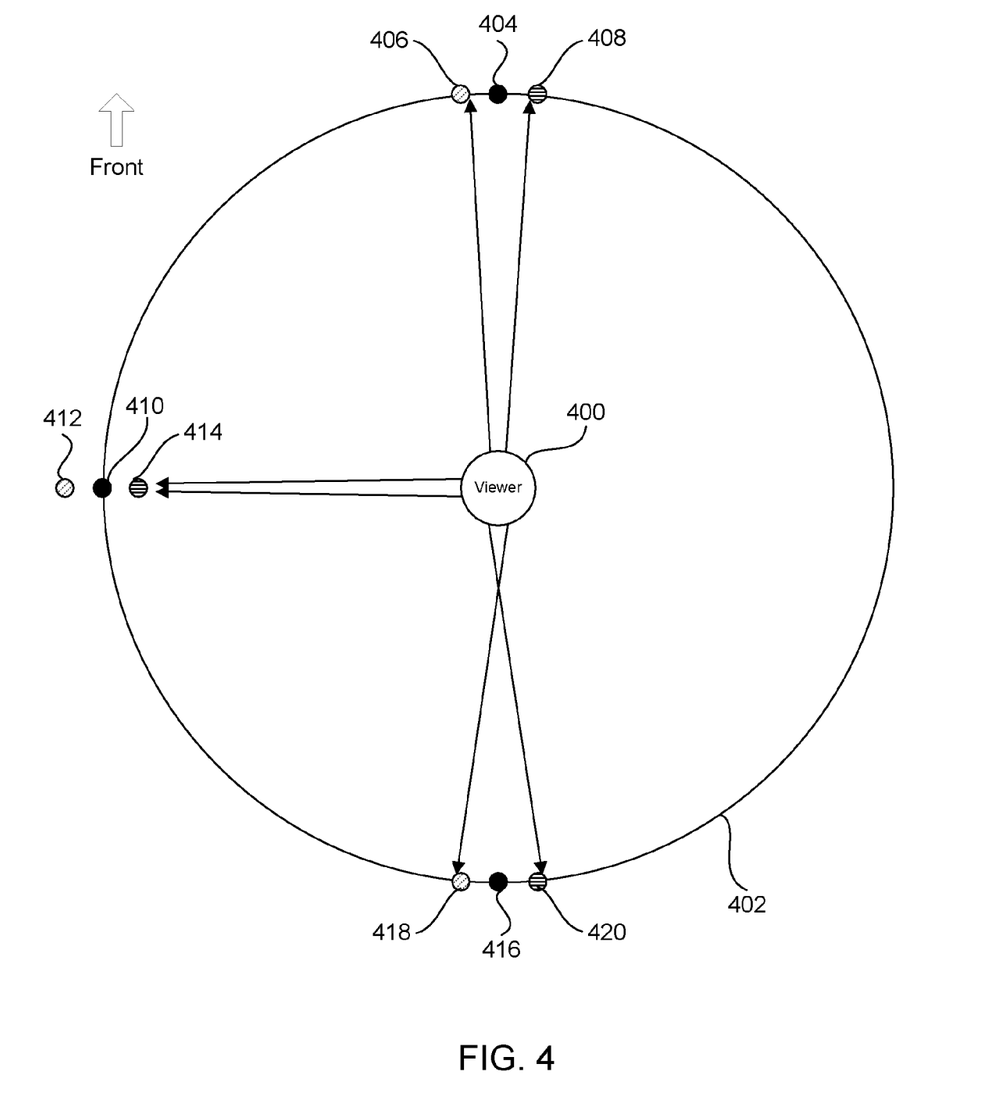
FIG. 4 illustrates where the 3-dimensional separation of points is applied to a spherical screen and the illusion falls apart when the image is not in front of the viewer.

Stereo images on a spherical screen will now be described as in FIG. 4. Examples of a spherical screen 402 may be a planetarium dome, curved movie screen, or similar curved screen or surface. When the 3-dimensional separation of points is applied uniformly to a spherical screen, then the 3D effect falls apart when the image is not in front of the viewer 400. FIG. 4 illustrates that a point straight ahead 404 of the viewer the point still looks correct because the illusion of the separated points works as expected. The left eye image is to the left 406 and the right eye image is to the right 408 of the viewer.

For a point to the side 410 of the viewer, the left image 412 and right image 414 may appear to be nearly on top of each other giving little or no separation at all for the stereo viewer. For a point at the rear 416, the left eye image 418 and right eye image 420 are reversed to a viewer that naturally rotates their view (or head) 180° in the horizontal direction (twisting the body or neck) from the forward position. This reversal destroys the 3D effect and can create an uncomfortable feeling for viewers or even motion sickness. For a viewer awkwardly arching their neck backwards 180° in the vertical direction from the forward position, the point would maintain the 3D effect but the point would appear upside down for the viewers. Simply computing the stereo points for each eye by adding the front facing eye separation to the point in space does not work in a spherical environment. For a traditional flat screen, the separation described is trivial, but for a spherical or hemi-spherical screen the known methods do not work.

A method and system will now be described by which a correct stereo eye pair can be presented to the viewer when using a curved screen, a completely spherical screen, or a part of a spherical surface. In one embodiment, the present invention provides a method for generating correct spherical stereo images on a spherical screen.

To create correct spherical stereo images on a spherical screen, the method can modify point positions in a mathematical model of a computer generated image to produce a final stereoscopic image that can generate the correct 3D stereo image for a viewer of a spherical surface or curved screen regardless of where the viewer is looking. Computer generated images are formed using mathematical models representing graphical objects, such as polygon primitives, splines, or meshes. Each graphical object can be comprised of a plurality of vertices. For example, a triangle is comprised of three vertex points. A vertex processor in a computer's graphical processing pipeline is used to determine where each vertex will be located in a digital image. This location information is then used to render and produce the image. This will be discussed more fully with respect to FIG. 6. To create correct spherical stereo images for display on a spherical screen, the vertex positions can be modified to create a stereoscopic image for the left and right eyes.

Figure 5A:
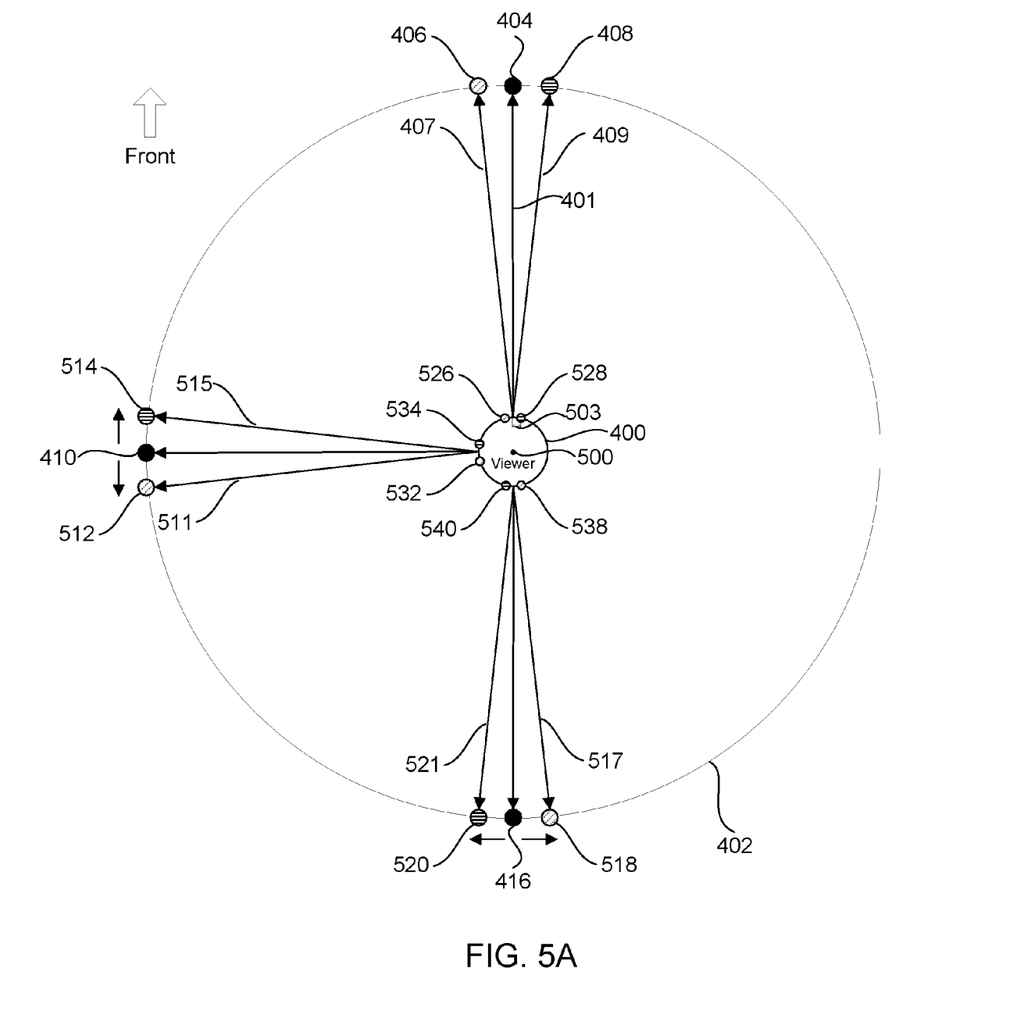
FIG. 5A illustrates the ability to compute the correct offset for any point by using a vector cross product in an embodiment.

As seen in FIG. 5A, by calculating the eye separation using a ray drawn from the viewer's location that is perpendicular to the screen, the left eye and right eye are always presented with the correct image as the viewer's head rotates to see the image. We can compute the correct offset for any point or vertex of a mathematical model by simply using a vector cross product as follows:

StereoPosition=MonoPosition+crossProduct(MonoPosition,EyePosition)/length Of (Monoposition)

Where:

MonoPosition=a vector originating at a center of an observer's head in three dimensional space (3-space) and ending at a point in space representing a vertex of a graphical object in the mathematical model.

EyePosition=a vector in 3-space from the center of the observer's head to one of the observer's eyes, StereoPosition=a vector in 3-space from the center of the observer's head to the vertex of the graphical object that has been shifted to produce a stereo image for the specified eye.

As illustrated in FIG. 5A, the correct offset can be calculated for both the left and right eyes in the three viewer positions shown in FIG. 5A which are the: front, side, and rear. The mono-position vector is represented from the center 500 of a theoretical observer for points relative to a distance of a screen on which the model will be displayed. A front point 404, a side point 410, and a rear point 416 relative to the viewer are shown. These points represent vertex positions for a standard, mono-image. The eye-position vector 503 is calculated from a center of the observer or viewers head 500 to a location of the viewer's eye. The stereoscopic position for each vertex can be calculated in three dimensional space using the equation:

$$S = M + \frac{M \times E}{|M|},$$

where, S is the stereo-position of a vertex calculated for a mono-position M of the vertex, and E is the eye-position vector.

The left eye-position in FIG. 5a is represented for front 526, side 532, and rear 538 positions, and the right eye-position is represented for front 528, side 534, and rear 540 positions. The resulting stereo-position vector for the left eye is shown for the front 407, side 511, and rear 517 positions of the head. The vectors point to the corrected vertex positions for the front 406, side 512, and rear 518 positions for the left eye. Similarly, the resulting stereo-position vectors for the right eye is shown for the front 409, side 515, and rear 521 head positions. These vectors point to the corrected vertex positions for the front 408, side 514, and rear 520 vertexes for the right eye. The length of the mono-position vector is the distance from the center of the head to the location of the mono-position vertex 404, 410, 416. In one embodiment, the length may be to the center of the head 500. Alternatively, the length may be measured from the front of the face between the eyes.

Using the Cartesian coordinate system (rectangular or orthogonal coordinate system), where:

mono-position is represented by vector $$m = m_x i + m_y j + m_z k = (m_x, m_y, m_z) = \begin{bmatrix} m_x \\ m_y \\ m_z \end{bmatrix},$$

eye-position is represented by vector $$e = e_x i + e_y j + e_z k = (e_x, e_y, e_z) = \begin{bmatrix} e_x \\ e_y \\ e_z \end{bmatrix}, \text{ and}$$

the center of the viewers head 500 is represented by vector $c = c_x i + c_y j + c_z k = (c_x, c_y, c_z) = (0, 0, 0)$, then $$StereoPosition \; s = s_x i + s_y j + s_z k = (s_x, s_y, s_z) = \begin{bmatrix} s_x \\ s_y \\ s_z \end{bmatrix}$$

$$\begin{bmatrix} s_x \\ s_y \\ s_z \end{bmatrix} = \begin{bmatrix} m_x \\ m_y \\ m_z \end{bmatrix} + \left( \begin{bmatrix} m_x \\ m_y \\ m_z \end{bmatrix} \times \begin{bmatrix} e_x \\ e_y \\ e_z \end{bmatrix} \right) \Big/ \sqrt{m_x^2 + m_y^2 + m_z^2}$$

$$\begin{bmatrix} s_x \\ s_y \\ s_z \end{bmatrix} = \begin{bmatrix} m_x \\ m_y \\ m_z \end{bmatrix} + \left( \begin{bmatrix} m_y e_z - m_z e_y \\ m_z e_x - m_x e_z \\ m_x e_y - m_y e_x \end{bmatrix} \right) \Big/ \sqrt{m_x^2 + m_y^2 + m_z^2}$$

$$\begin{bmatrix} s_x \\ s_y \\ s_z \end{bmatrix} = \begin{bmatrix} m_x + (m_y e_z - m_z e_y)/\sqrt{m_x^2 + m_y^2 + m_z^2} \\ m_y + (m_z e_x - m_x e_z)/\sqrt{m_x^2 + m_y^2 + m_z^2} \\ m_z + (m_x e_y - m_y e_x)/\sqrt{m_x^2 + m_y^2 + m_z^2} \end{bmatrix}$$

The method may also use a polar coordinate system or other coordinate system that can be used to apply vector operations, like the cross product operation.

For the 3D image to have the proper effect on the viewer, the relationship of the left eye stereo-position vector to the mono vertex position vector on the screen and the relationship of right stereo eye-position vector to the mono vertex position vector on the screen should represent real world distances between the viewer eyes and the screen. The center position of the viewer or the center of the viewer's head may be used as a reference point or origin for the mono vertex position vector, left eye-position vector, and right eye-position vector used to calculate the stereo left and right vertex points. The center position may be a theoretical position used for the calculation of the mono vertex position vector, left eye-position vector, and right eye-position vector. Thus, the center position of the viewer may be varied in relationship to left eye-position and right eye-position as long as the relationship between the mono vertex position vector, left eye-position vector, and right eye-position vector remains the same between representative models. When the relationship between the mono vertex position vector, left eye-position vector, and right eye-position vector remains the same between representative models, the calculation of stereo left and right vertex points will generate the same result.

Figure 5B:
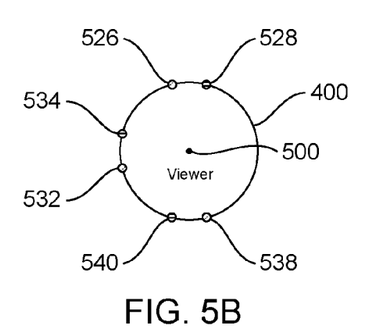
FIG. 5B illustrates a placement of a left eye vector and a right eye vector relative to a center point of a viewer's position in an embodiment.

The exemplary illustrations shown in FIG. 5a is illustrated with respect to a positive horizontal parallax projection of an object, wherein the object that will be viewed on the curved screen appears to be located behind the screen. An example of a positive horizontal parallax projection is shown in FIG. 5f. The point 570 being projected appears behind the projection plane. The projection onto the projection plane (screen) 572 for the left eye 574 is on the left and the projection for the right eye 576 is on the right. The distance between the left and right eye is called the horizontal parallax. Since the projections are on the same side as the respective eyes, it is called positive parallax.

Figure 5C:
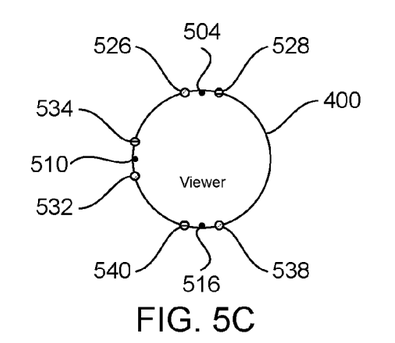
FIG. 5C illustrates a placement of a left eye vector and a right eye vector relative to a left and right eye midpoint used for a viewer's position in an embodiment.
Figure 5D:
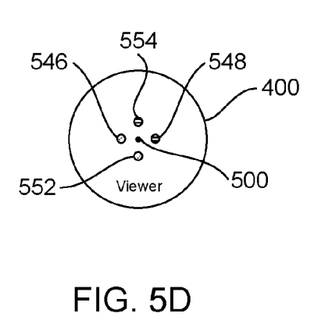
FIG. 5D illustrates a placement of a left eye vector and a right eye vector where the midpoint between the left and right eye is a center point of a viewer's forward and side positions in an embodiment.
Figure 5E:
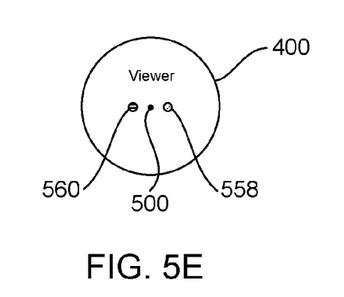
FIG. 5E illustrates a placement of a left eye vector and a right eye vector where the midpoint between the left and right eye is a center point of a viewer's rear position in an embodiment.
Figure 5F:
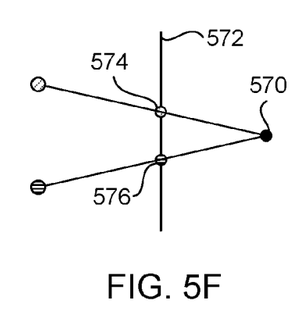
FIG. 5F illustrates an exemplary diagram of positive horizontal parallax projection.
Figure 5G:
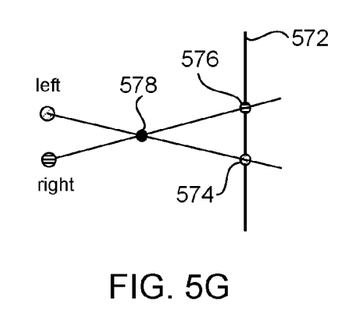
FIG. 5G illustrates an exemplary diagram of negative horizontal parallax projection.

If a vertex to be projected 578 is located in front of the projection plane 572, as illustrated in FIG. 5g, then the projection for the left eye 574 is on the right and the projection for right eye 576 is on the left. This is known as negative horizontal parallax. When a point being projected is located in front of the projection plane, then the example given in FIG. 5a will be reversed, with the right eye on the left side of the screen, and the left eye on the right side of the screen.

For calculations, the left and right eye-position vector may have various placements relative to the center of the viewer's head or the viewer position. As illustrated in FIG. 5B, the center position may represent the anatomical distance of the viewer's left and right eyes from the center of the viewer's head. Using an anatomical representation of the center position, the distance of both the left eye-position 526, 532 and 538 and right eye-position 528, 534, and 540 are closer to the mono vertex position 404, 410, and 416 on the screen (as shown in FIG. 5A) than the center of the viewer position 500 is to the mono vertex position on the screen, because the eyes are in front of center of the viewer's head. In this configuration, the left and right eye-position vectors rotate around the center of the viewer position, and the center of the viewer position remains fixed as the viewer's head rotates. The viewer position may be set to (0, 0, 0).

In another embodiment as illustrated in FIG. 5C, the center of the viewer position 504, 510, 516 shifts to the midpoint between the left eye-position vector 526, 532, and 538 and right eye-position vector 528, 534, and 540. The center of the viewer position rotates compared to the screen with a change in the left and right eye-position vectors.

In another configuration as illustrated in FIGS. 5D and 5E, the midpoint between the left eye-position vector 546, 552, and 558 and right eye-position vector 548, 554, and 560 is shifted to the center of the viewer position 500, so the viewer position remains fixed for all calculations. The left and right eye-position vectors represent the front 546 and 548, side 552 and 554, and rear 558 and 560 positions. The left and right eye-position vectors rotate about the center of the viewer position. Using this configuration may simplify the calculation because the center of the viewer position can be set to (0, 0, 0) coordinate and an imaginary line from the left and the right eye-positions will intersect or pass through the (0, 0, 0) coordinate representing the center of the viewer position.

Figure 6:
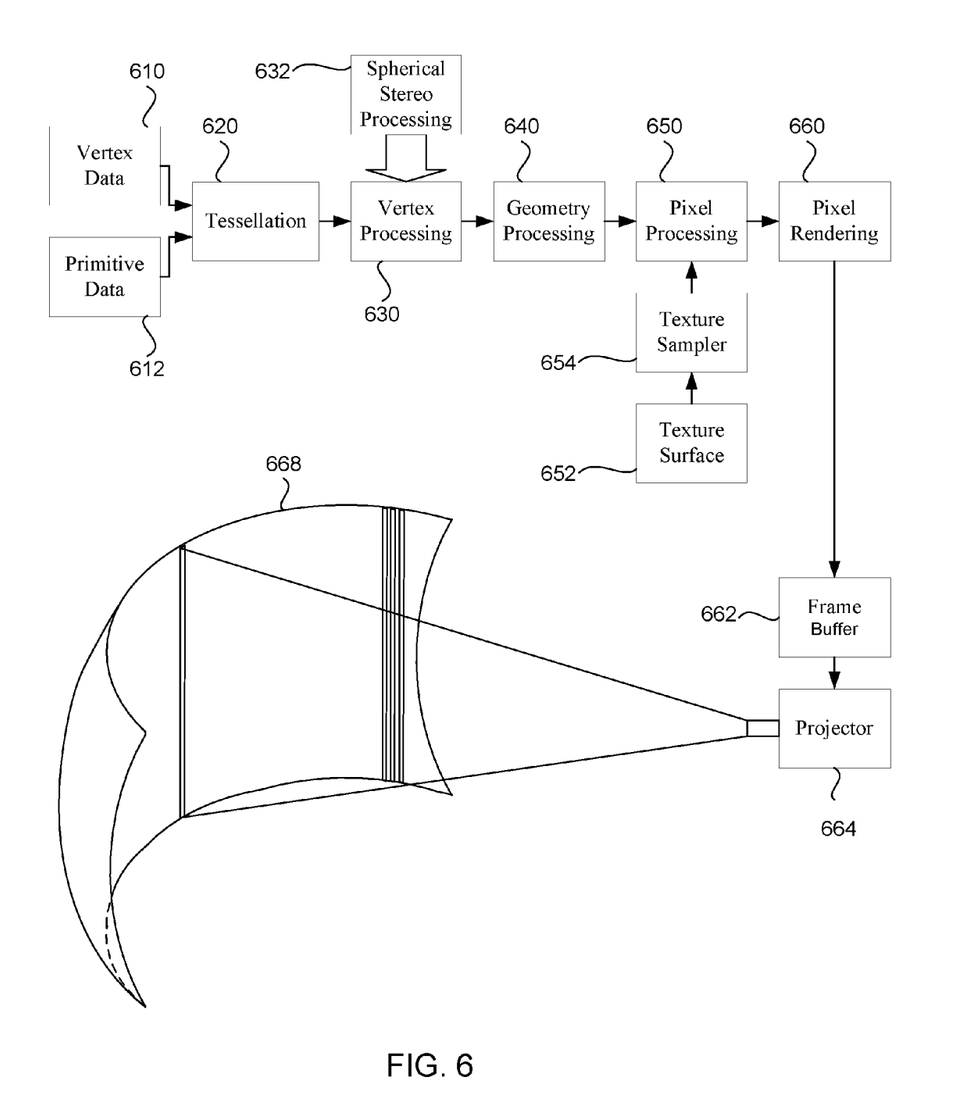
FIG. 6 is a block diagram illustrating the spherical stereo computation modules applied to a 3-dimensional graphics rendering process in an embodiment.

One example application of using the spherical stereo system and method is in computer rendering. A computer rending process pipe flowchart is illustrated in FIG. 6. In a 3D computer graphics model, an object is made up of an array of mathematical points or vertices which are connected to form a mesh. By applying the above described calculation to every vertex as the vertex passes down the graphics pipeline, all the objects in a scene can be correctly viewable in stereo 3D in a spherical or semi-spherical viewing environment. The processes in a computer rending process pipeline may be performed by a rendering module.

A 3D graphics rendering process or pipeline may begin with memory buffers storing vertex data 610 and primitive data 612. The vertex data may be untransformed model vertices, while the primitive data may be geometric primitives, including points, lines, circles, and polygons referenced by the vertex data using index buffers. In some applications, tessellation 620 may be used to convert higher-order primitives, displacement maps, and mesh patches to vertex locations and store the converted primitive data vertex locations to the vertex memory buffer 610. A mono-position vertex vector value in 3-space can be calculated, with the vector beginning at a center of a theoretical observer's head location and ending at a vertex location of a theoretical screen. The actual length and direction of the mono-position vertex vector in the computer model of the image should be equivalent to a distance between an actual observer and the location on the curved screen on which the vertex that is used to form an image that will be displayed. An eye-position vector can also be calculated, with the eye-position vector starting at the center of the observer's head and ends at one of the observer's eye positions, either right or left. In one embodiment, the left eye position may be a positive vector and the right eye position can be a vector in the opposite direction as the left eye position vector. The length and direction of the mono-position vertex vector and each of the eye-position vectors can be stored in the vertex memory buffer.

Next, the vertex processing 630 may apply 3-dimensional transformations to the vertex points in the vertex buffers using the equation previously described to generate the vertex points for the left and right stereoscopic image. For spherical screens and applications the spherical stereo processing 632 of the present system and method may be applied. The vertex processor is configured to create a left vertex point and a right vertex point for each vertex point in a computer generated image that is desired to be shown as a stereo image. A left vertex point location is calculated by adding the mono-position vertex vector to a cross product of the mono-position vertex vector and the eye-position vector. The cross product is divided by a length of the mono-position vertex vector to form a left vertex vector pointing from the center of the observer's head to the left vertex. Similarly, a right vertex point location is calculated by adding the mono-position vertex vector to a cross product of the mono-position vertex vector and a negative eye-position vector. Again, the cross product is divided by a length of the mono-position vector to form a right vertex vector pointing to the right vertex.

The geometry processing 640 may follow, providing clipping, back face culling, attribute evaluation, prospective dividing, viewport transformations, and rasterization to the transformed vertices.

The pixel shader operations may modify the geometry vertex data from the geometry processing 640 and texture data in pixel processing 650. The texture data may consist of texture map data 652 filtered to the level-of-detail desired by a texture sampler 654. The output of the pixel processing may be used by pixel rendering 660 to modify pixel color values with alpha, depth, and stencil testing, or by applying alpha blending or fog.

The spherical stereo algorithm described can be added during the vertex processing phase of the pipeline and before colors or textures are applied to the models. In one example, all of the imaging is rendered using the rendering module into a frame buffer 662 and then projected onto a curved screen 668. The frame buffer may be a single buffer, or a dual buffer for the left and right stereo images. The rendered pixels can be displayed on the curved screen using an output device 664 such as a video projector. The curved screen can be spherical, toroidal, or another shape. Since the stereoscopic image is formed early in the graphics pipeline 600, the stereoscopic image can be calculated for and displayed on any shape of curved screen. The end viewers can then use one of the many eye image separation schemes that are known to enable the viewer to see a 3D image for the curved screen by separating the displayed image into the first and second stereo eye images for the left and right eye respectively.

In other words, two images are created by applying the eye-position vector and the negative of the eye-position vector to the position of any given point in the mathematical model using the cross-product function and adjusting the vector length by the length of the mono-position vector. Thus, two images are created and the viewer can see the two images on the screen. Finally, image separation eyewear or another mechanism is used separate the two images for the individual's eyes.

The curved screen is defined to have at least 45 degrees of curvature so that the curvature is enough to destroy the 3D effect on the screen using other 3D imaging methods for the points or vertices on the screen. However, the present invention can be used on any type of screen including flat screens.

Figure 7:
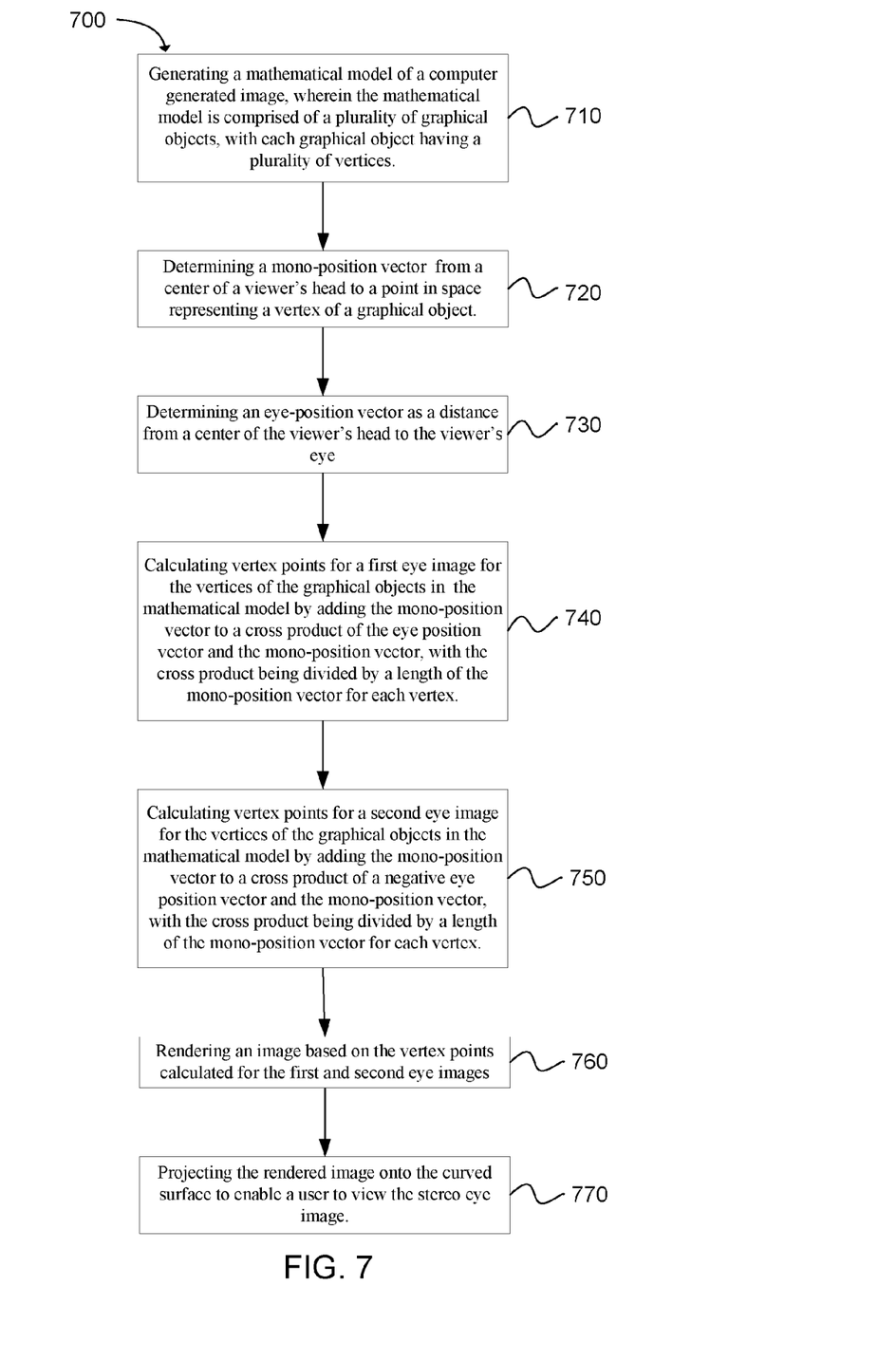
FIG. 7 is a flow chart depicting a method for displaying a stereo eye image on a curved surface in an embodiment.

FIG. 7 illustrates a method 700 for displaying a stereo eye image on a curved surface. The method includes the operation of generating a mathematical model of a computer generated image, wherein the mathematical model is comprised of a plurality of graphical objects, with each object having a plurality of vertices, as in block 710. The mathematical model of scene geometry can be received by a vertex processor from a vertex database.

A mono-position vector in three dimensional space can be determined from a center of a viewer's head to a point in space representing a vertex of a graphical object in the mathematical model, as in block 720. An eye-position vector in three dimensional space can be determined from a center of the viewer's head to the viewer's eye, as in block 730.

Vertex points for a first eye image can be calculated for the vertices of the graphical objects in the mathematical model by adding the mono-position vector to a cross product of the eye-position vector and the mono-position vector, with the cross product being divided by a length of the mono-position vector for each vertex, as in block 740. Similarly, vertex points for a second image can be calculated for the vertices of the graphical objects in the mathematical model by adding the mono-position vector to a cross product of a negative eye-position vector and the mono-position vector, with the cross product being divided by a length of the mono-position vector for each vertex, as in block 750.

Once the vertex points for the first and second eye images have been calculated, the image can be rendered, as in block 760. The rendered image can then be projected onto the curved surface to enable a user to view the stereo eye image, as in 770.

Figure 8:
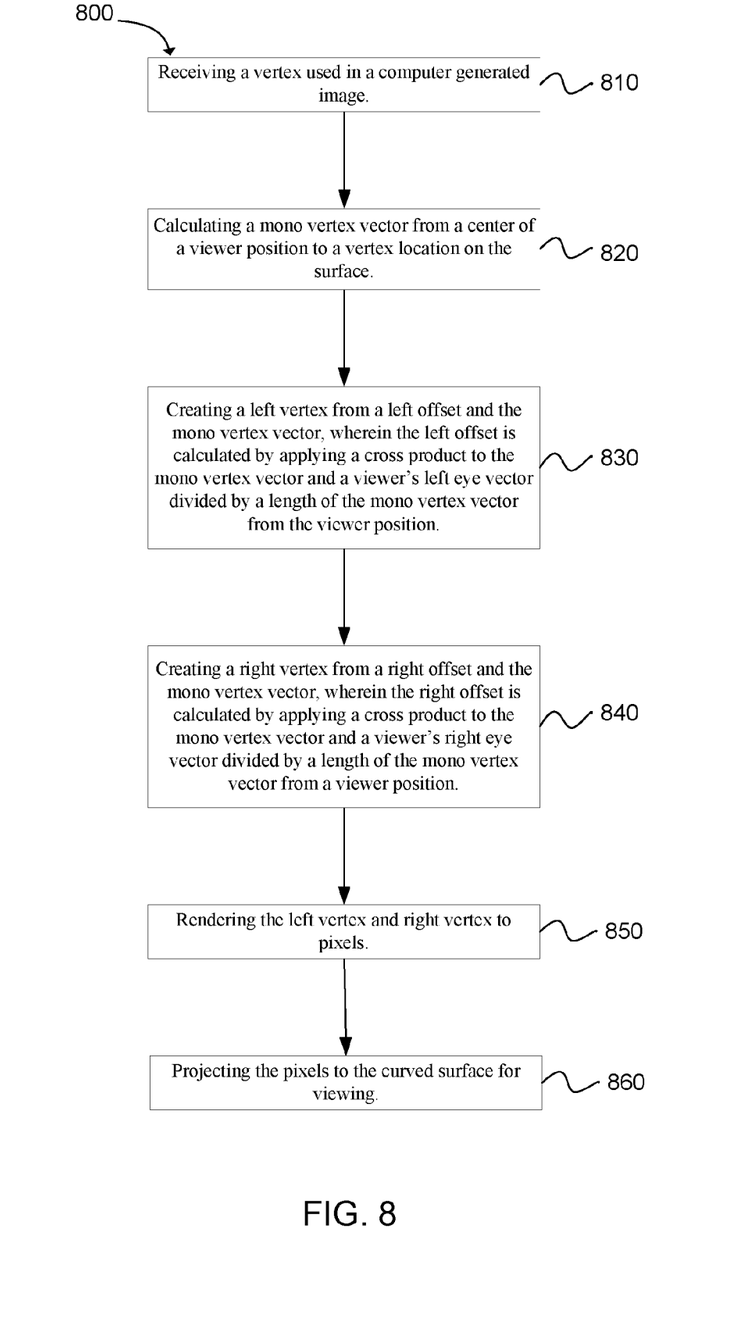
FIG. 8 is a flow chart depicting a method for displaying a stereo eye image on a curved surface.

In another embodiment, a method 800 for displaying a stereo eye image on a curved surface is disclosed, as illustrated in the flow chart depicted in FIG. 8. The method includes the operation of receiving 810 a vertex used in a computer generated image. A mono vertex vector is calculated 820 from a center of a viewer position to a vertex location on the curved surface. A left vertex vector is created using the mono vertex vector and a viewer's left eye vector. The left vertex vector is calculated 830 by applying a cross product to the mono vertex vector and the viewer's left eye vector divided by a length of the mono vertex vector from the viewer position. A left vertex is created at a location where the left vertex points to. Similarly, a right vertex is created 840 at a location where a right vertex points to. The right vertex is calculated by applying a cross product to the mono vertex vector and a viewer's right eye vector divided by a length of the mono vertex vector from a viewer position. After the left and right vertexes have been created, the vertexes can be rendered 850 to pixels. The pixels can be projected 860 to the curved surface for viewing.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method for displaying a stereo eye image on a curved surface, comprising the steps of:
   (a) generating a mathematical model of a computer generated image, wherein the mathematical model is comprised of a plurality of graphical objects, with each graphical object having a plurality of vertices;
   (b) determining a mono-position vector from a center of a viewer's head to each point representing each vertex in the plurality of graphical objects;
   (c) determining an eye-position vector as a distance from the center of the viewer's head to the viewer's eye;
   (d) calculating vertex points with a vertex processor for a first eye image for the vertices of the plurality of graphical objects in the mathematical model by adding the mono-position vector to a cross product of the eye-position vector and the mono-position vector, with the cross product of the eye-position vector and the mono-position vector being divided by a length of the mono-position vector to calculate each vertex point for the first eye image for each of the vertices in the plurality of graphical objects;
   (e) calculating vertex points with the vertex processor for a second eye image for the vertices of the plurality of graphical objects in the mathematical model by adding the mono-position vector to a cross product of a negative eye-position vector and the mono-position vector, with the cross product of the negative eye-position vector and the mono-position vector being divided by a length of the mono-position vector to calculate each vertex point for the second eye image for each of the vertices in the plurality of graphical objects;
   (f) rendering an image with a pixel rendering module based on the vertex points calculated for the first and second eye images with the vertex processor; and
   (g) projecting the rendered image onto the curved surface with a video projector to form a stereo eye image viewable by the user.

2. A method as in claim 1, wherein said step of calculating vertex points for the first eye image comprises calculating vertex points for a left eye image.

3. A method as in claim 1, wherein said step of calculating vertex points for the second eye image comprises calculating vertex points for a right eye image.

4. A method as claim 1, wherein said step of determining the mono-position vector further comprises calculating the vector from the center of the viewer's head, wherein the center is measured from a front of the viewer's head between the viewer's eyes.

5. A method as in claim 1, further comprising calculating vertex points for the first and second eye images using a vertex processing module having a vertex shader.

6. A method as in claim 1, further comprising determining an eye-position vector length as a length from a midpoint between the viewer's eyes to a midpoint of one of the viewer's eyes.

7. A method as in claim 1, wherein said step of determining the eye-position vector length further comprises setting the eye-position vector length as an expected anatomical distance of the viewer's left and right eye from the midpoint between the viewer's eyes.

8. A method as in claim 1, wherein said step of rendering an image further comprises performing vertex processing, geometry processing, and pixel processing on each of the graphical objects.

9. A method as in claim 1, further comprising viewing the stereo image on the curved screen using viewing glasses configured to differentiate between the first eye image and the second eye image.

10. A system for displaying a stereo eye image on a screen, comprising:
  (a) a vertex memory buffer configured to store a mono-position vertex vector and an eye-position vector, wherein the mono-position vertex vector begins at a center of a viewer's head and ends at a vertex location and the eye-position vector begins at the center of the viewer's head and ends at an eye-position;
  (b) a vertex processor configured to create a left vertex and a right vertex by:
    calculating a left vertex location by calculating a cross product of the mono-position vertex vector and the eye-position vector, dividing the cross product of the mono-position vertex vector and the eye-position vector by a length of the mono-position vertex vector, and adding the mono-position vertex vector to the divided cross product for the left vertex location to form a left vertex vector pointing to the left vertex location;
    calculating a right vertex location by calculating a cross product of the mono-position vertex vector and a negative eye-position vector, dividing the cross product of the mono-position vertex vector and a negative eye-position vector by a length of the mono-position vertex vector, and adding the mono-position vertex vector to the divided cross product for the right vertex location to form a right vertex vector pointing to the right vertex location; and
  (c) a rendering module configured to render the left vertex location and the right vertex location to a frame buffer to form a stereo image operable to be displayed on the screen having a curved surface using a video projector.

11. A system as in claim 10, wherein at least a portion of the screen has a spherical surface.

12. A system as in claim 10, wherein the stereo eye image represents a 3-dimensional image to the viewer.

13. A system as in claim 10, further comprising a stereo viewing mechanism enabling the viewer to view the left vertex in the viewer's left eye and the right vertex in the viewer's right eye.

14. A system as in claim 13, wherein the stereo viewing mechanism is eyewear with a left lens and a right lens, wherein the left lens filters out the image derived from the right vertex, and the right lens filters out the image derived from the left vertex.

15. A system as in claim 10, wherein the rendering module is further configured to store vertex data, process vertex data, perform geometry processing, convert vertex data into pixels, and render the pixel into an image for the projector.

16. A system as in claim 15, wherein the rendering module further comprises the vertex processor.

17. A system as in claim 10, wherein the eye-position vector is computed from a midpoint of the viewer's eye position to a midpoint of a front of the viewer's head.

18. A system as in claim 10, wherein the left vertex vector and the right vertex vector is the expected distance from a center position of the viewer represented as a vector in 3-space to the left vertex and the right vertex, respectively.

19. A method for displaying a stereo eye image on a curved surface, comprising the steps of:
  (a) receiving a vertex used in a computer generated image;
  (b) calculating a mono vertex vector with a vertex processor from a center of a viewer position to a location of the vertex on the curved surface;
  (c) creating a left vertex from a left offset and the mono vertex vector, wherein the left offset is calculated with the vertex processor by applying a cross product to the mono vertex vector and a viewer's left eye vector divided by a length of the mono vertex vector from the viewer position;
  (d) creating a right vertex from a right offset and the mono vertex vector, wherein the right offset is calculated with the vertex processor by applying a cross product to the mono vertex vector and a viewer's right eye vector divided by the length of the mono vertex vector from the viewer position;
  (e) rendering the left vertex and right vertex to pixels using a rendering module; and
  (f) projecting the pixels to the curved surface for viewing using a video projector.

20. A method as in claim 19, wherein the viewer's left eye vector and the viewer's right eye vector are based on an anatomical distance of the viewer's left and right eye from a midpoint of the viewer position.

* * * * *